Jan. 20, 1953  J. E. ECHLIN ET AL  2,626,373
SWITCH FOR RELAY CIRCUITS FOR AUTOMOBILES OR THE LIKE
Filed Aug. 2, 1949  2 SHEETS—SHEET 1
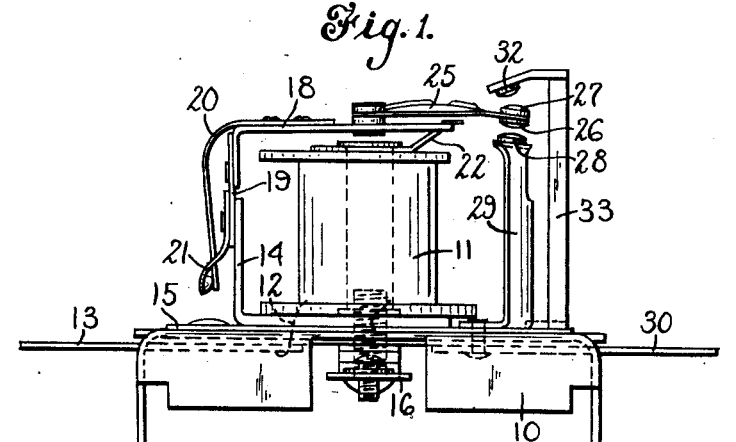
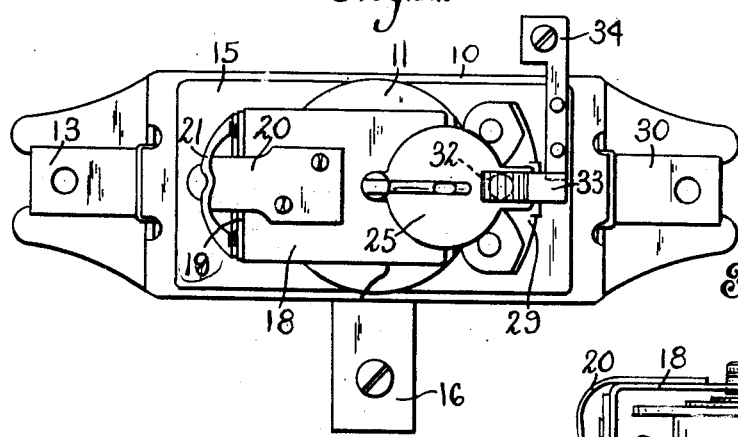
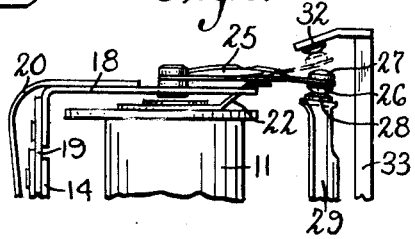
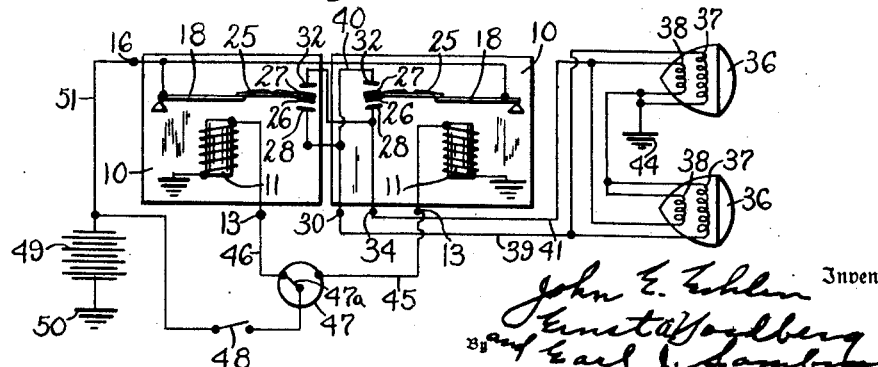
Inventors
John E. Echlin
Ernst A. Fogelberg
Earl J. Lambrook
By Rockwell & Bartholow
Attorneys

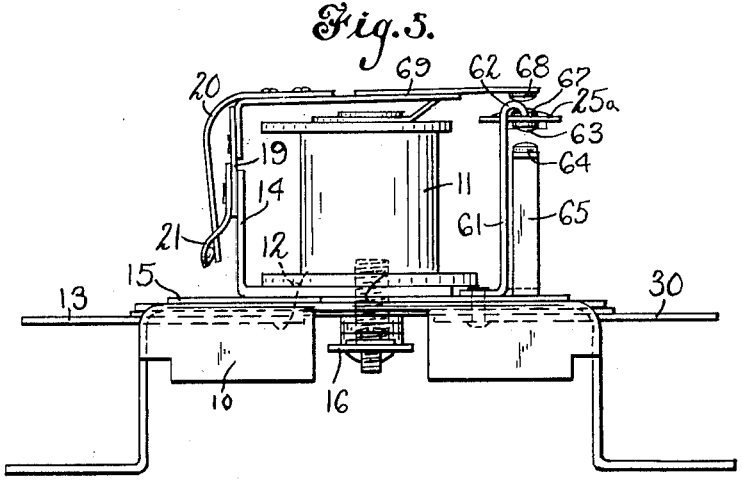
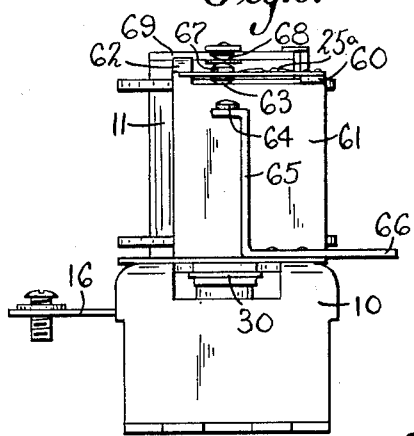
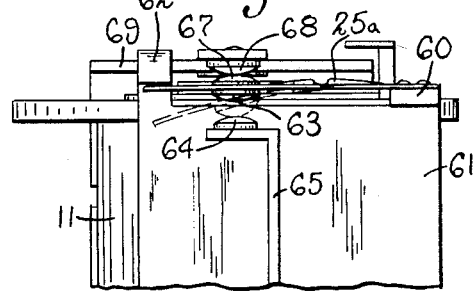
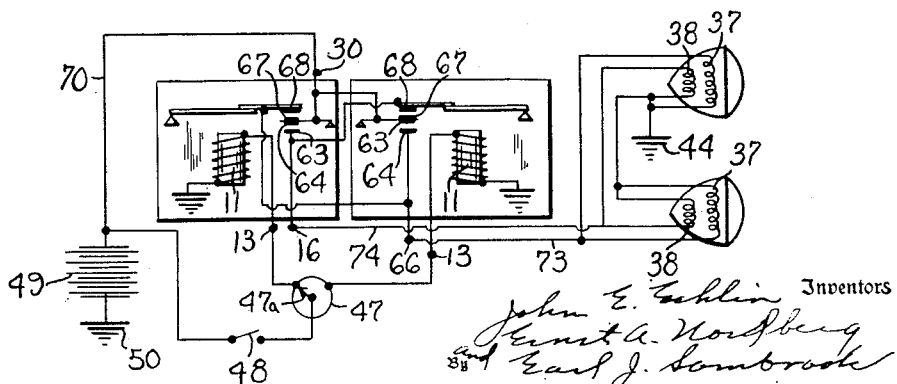

Patented Jan. 20, 1953

2,626,373

UNITED STATES PATENT OFFICE 2,626,373

SWITCH FOR RELAY CIRCUITS FOR AUTOMOBILES OR THE LIKE

John E. Echlin, New Haven, Ernst A. Nordberg, Westport, and Earl J. Sambrook, Hamden, Conn., assignors to Echlin Manufacturing Company, New Haven, Conn., a corporation of California Application August 2, 1949, Serial No. 108,174

5 Claims. (Cl. 315—83)

This invention relates to a switch for relay circuits for automobiles or the like and more particularly to a circuit-making or breaking relay which may be employed in various relations, such as in electrical circuits in automobiles so as to prevent excessive heating of the wiring, or the blowing of a fuse, due to a short circuit.

It very often occurs that a short circuit develops in the wiring of the lighting system of automobiles. When such a short circuit occurs, it may result in the disabling of the headlight lamps, or the blowing of a fuse in the circuit, in either of which events the lights will not function. It is contemplated by the present invention to provide a bimetallic temperature-responsive element in the circuit so that if a short circuit occurs, the bimetallic member will respond to the heat developed by the current overload and break the circuit. As illustrated, this bimetallic member is a part of a relay provided in the wiring, the arrangement being such that a relay circuit is closed by a switch, the relay in turn closing the load circuit through a temperature-responsive element so as to operate the lamps or other devices on the load circuit.

It is common practice to provide each of the headlights of an automobile with a high and a low beam, and usually an auxiliary switch in the form of a toe button controls the current supply to one beam or the other when the main lighting switch is in the "on" position. That is to say the main switch is turned on to supply current to the headlights and the auxiliary switch determines whether the current is supplied to the low beam circuit or to the high beam circuit.

In the present invention the arrangement is such that if a short develops in the high beam circuit, the temperature-responsive element will operate automatically to switch the current to the low beam circuit due to the heating of a bimetallic element. When the latter cools, it may again close the high beam circuit but upon reheating will immediately break this circuit and again close the low beam circuit.

Likewise, if a short develops in the low beam circuit the bimetallic element will switch the current to the high beam circuit. Accordingly, a short in either of the high or low beam circuits will cause intermittent action or a flashing of the lamps in the other circuit.

One object of the present invention is to provide a new and improved wiring circuit for automobile headlights or the like.

Still another object of the invention is to provide a new and improved relay circuit so arranged that when a short circuit occurs the circuit will be broken.

Still another object of the invention is to provide a temperature-responsive element designed to make contact with contact members of either of two electrical circuits, the arrangement being such that upon overheating of one of the circuits the bimetallic member will be caused to engage the contact of the other circuit and energize the latter.

To these and other ends the invention consists in the novel features and combinations of parts to be hereinafter described and claimed.

In the accompanying drawings:

Fig. 1 is a side elevational view of a circuit-opening and closing relay embodying our invention;

Fig. 2 is a top plan view thereof;

Fig. 3 is a fragmentary view of the upper portion of the relay showing the armature in position in which it is attracted toward the relay magnet;

Fig. 4 is a wiring diagram of an automobile headlight circuit embodying our invention;

Fig. 5 is a side elevational view of a modified form of relay embodying our invention;

Fig. 6 is a front elevational view thereof;

Fig. 7 is a fragmentary enlarged view similar to Fig. 6 showing the parts in the positions occupied when the armature is attracted toward the relay magnet; and Fig. 8 is a wiring diagram of an automobile headlight system embodying this form of our invention.

To illustrate a preferred embodiment of our invention, we have shown in Figs. 1 to 3 of the drawings a relay comprising a base 10 of conducting material upon which is mounted an electromagnet 11. As will be understood, one terminal of the coil 11 is connected with the base 10 which is grounded upon the chassis of the automobile while the other end of the coil is connected by a wire 12 to a strap 13 leading to a switch, which in this case may be the auxiliary or dimmer headlight switch of the car, which, as will be explained hereinafter, connects this end of the coil of the magnet 11 with one terminal of the car battery. As the other terminal of the car battery is grounded, this will complete the circuit through the relay.

Secured upon the base 10 below the magnet 11 is an L-shaped supporting member 14 which is insulated, by the insulating plate 15, from the base but which is electrically connected to the strap 16, the latter also being insulated from the base and designed to be connected by a conductor wire to the car battery, as will be hereinafter explained. An armature 18 is hinged to the member 14 by the relatively flexible hinge plate 19, and a spring 20 secured to the armature 18 and having its lower end retained by a strap 21 secured to the support 14 normally holds the armature away from the pole of the magnet, or in the position shown in Fig. 1. The upper position of the magnet under the urge of the spring 20 may be limited by a stop member 22 secured to the magnet and passing loosely through a slot in the body of the armature.

Mounted upon the armature 18 is a bimetallic temperature-responsive element 25 which is electrically connected to the armature and which carries contacts 26 and 27 on its free end, one being on the lower side of the member 25 and the other on the upper side.

Contact 26 is adapted to engage a cooperating contact 28 on a post 29 supported by, but insulated from, the base 10 but electrically connected to a strap 30 which may be connected with one of the light beams, either the high or low. Contact 27 is adapted to cooperate with a contact 32 mounted on a post 33 also supported by the base 10 and insulated therefrom, but connected with a strap 34 which in practice is connected with the other light beam.

It will be apparent that when the magnet 11 is energized the armature 18 will be drawn downwardly toward the magnet about its hinge 19 and thus cause the contact 26 to engage the contact 28 as shown in full lines in Fig. 3. Assuming that the strap 30 is connected to the high beam of the lights, this beam will now be lighted and as long as the switch is on, the armature 18 would remain in the position shown.

However, if there is a short circuit in the lamp circuit or load circuit, so that an excessive amount of current passes through the bimetallic member 25, this member will become heated and flex into the position shown in dotted lines in Fig. 3 in which the contact 27 engages the contact 32 and this serves to direct the current in the load circuit to the low beam of the headlights so that the latter will be lighted. As soon as the bimetallic member 25 cools, it will flex in the other direction and be restored to the full-line position shown in Fig. 3 which will again draw the current through the high beam. Thus an intermittent lighting of the high and low beams will take place, but the current passing through the load circuit, due to the short circuit, will not be permitted to blow out the fuse (if a fuse is used), nor will the wiring be permitted to develop sufficient heat to injure the installation. The fuse, therefore, may be omitted with the present installation as the temperature-responsive element 25 will afford adequate protection to the wiring.

In Fig. 4 of the drawing, we have shown a wiring diagram of a circuit including the two headlights of an automobile with which our invention may be employed. In the circuit, two of the relay switches described above are employed and so far as consistent the elements of the diagram are given the same numerals as the corresponding elements previously described. The headlights are shown at 36 having upper or high beams 37 and low beams 38. Current is delivered to the upper beams by a conductor 39 which may lead to the strap 30 which, as shown in Fig. 1, is connected to the contact 28 of one of the relays. A wire 40 within the unit will also connect the strap 30 with the contact 32 of the other relay. Likewise, the current is directed to the lower beams by the wire 41 which leads to the strap 34 connected with the contact 32 of one of the relays, which contact will also be connected to the contact 28 of the other relay.

The lamp beams are grounded at 44 and conductors 45 and 46 lead from the dimmer switch 47 to the relay coils 11 of the lower and upper beam circuits, respectively. This switch is connected through the dash-light switch 48 with the battery 49, which may be grounded on the frame of the car at 50. A conductor 51 also leads from the battery 49 to the strap 16 which is connected with both of the relay armatures 18.

With the switch 47 set in the position shown in Fig. 4 it will be apparent that when the switch 48 is closed the relay coil 11 at the left of the diagram will be energized, thus drawing down the corresponding armature 18 and thus causing engagement of the contacts 26 and 28 of this relay to close the circuit between the battery and the upper beams 37 of the headlights by way of the strap 30 and conductor 39. If, however, a short circuit develops in the lamp circuit to cause an overload of current and heat the temperature-responsive element 25, the latter will flex upwardly causing engagement of the contacts 27 and 32, and breaking the circuit at 26 and 28. The current from the battery will now be conducted through this contact 32 across to terminal 28 of the other relay and thus through strap 34 and wire 41 to the low beams of the headlights. The low beams will then continue to function until the element 25 has cooled sufficiently to return to its former position, and again effect engagements of the contacts 26 and 28.

If the contact 47ª of the switch 47 is moved so as to engage the terminal of the conductor 45, closing of the main switch 48 will energize the coil 11 of the relay shown on the right of Fig. 4. This will effect engagement of contacts 26 and 28 and as the latter is connected with the low beams of the headlights, the latter will be lighted. If, however, a short occurs in this circuit, the temperature-responsive element 25 will flex upwardly and contact 27 will engage contact 32, thus directing the current to the upper beams of the headlights, which will continue to be lighted until the element 25 has cooled sufficiently to return to its former position. Thus, with the arrangement shown, when a short occurs in either the upper or lower beam circuits, the current will be switched automatically to the other of the circuits and intermittent operation of the lamps will be attained but the wiring will be protected against excessive overload.

In the embodiment of our invention shown in Figs. 1 to 3, the temperature-responsive element is mounted upon the armature and is moved by the latter to complete the circuit through the load circuit when the coil of the magnet 11 is energized. It will be understood, however, that the flexing of this element due to temperature changes takes place independently of the position of the armature. That is, as shown in Figs. 1 and 3, the temperature-responsive element will flex upwardly to effect engagement of the contacts 27 and 32 without any movement of the armature away from the magnet.

In Figs. 5 to 7 of the drawings there is shown a modification of the invention in which the temperature-responsive element is mounted upon a contact post or plate supported by the base and not upon the armature. In this instance the temperature-responsive element 25ᵃ is secured at one end to a lug 60 mounted upon a plate 61, which corresponds to the post 29 shown in Fig. 1, and is electrically connected with the strap 30, which in this instance is connected to the battery 49. The opposite free end of the armature 25ᵃ is limited in its upward movement by a stop finger 62 formed integrally with the plate 61.

This temperature-responsive element 25ᵃ carries a contact 63 on its lower side adapted to engage a contact 64 on a post 65 which is formed with a strap member 66 which leads to one of the beams of the headlights. On its upper side the temperature-responsive member has a contact 67 adapted to engage a contact 68 mounted on the armature 69. As before, the armature 69 is electrically connected with the strap 16, which in this instance leads to the other beam of the headlights.

The parts normally stand in the position shown in Figs. 5 and 6 of the drawings, in which the temperature-responsive element 25ᵃ rests against the stop finger 62, and both circuits are open. When, however, the headlight switch is closed, the armature 69 is moved downwardly, thus effecting engagement of the contacts 67 and 68 and completing a circuit through these contacts. If, however, for any reason the load in this circuit becomes excessive, the temperature-responsive element 25ᵃ will flex downwardly, as shown in dotted lines in Fig. 7, thus effecting engagement between the contacts 63 and 64, which breaks the first circuit and closes a second circuit which includes the post 65.

In Fig. 8 of the drawings, we have shown a wiring diagram of an automobile headlight circuit incorporating this embodiment of our invention. In this case also two relays are employed, one being energized when the dimmer switch is set in position to use the lower beam of the headlights and the other when the dimmer switch is in position to use the upper beam. As shown, the battery 49 is connected by a wire 70 with the strap 30 which leads to the temperature-responsive elements 25ᵃ of each of the relay units. The contact 64 of one of the relay units, that on the left, leads to the lower beam 38 of the headlights while the corresponding contact member 64 on the relay unit on the right leads to the high beams 37 of the headlights. The coils of the electromagnets 11 are each connected to one of the poles of the toe dimmer switch 47, which is connected to the battery 49 through the dashboard light switch 48. The contact 64 of each of the relay units is connected respectively to the contact 68 of the other relay unit.

With the above wiring, it will be apparent that when the switch 48 is closed, with the switch 47 in the position shown, the electromagnet at the left of the diagram will be energized and the contact 68 moved downwardly into engagement with the contact 67 upon the upper side of the temperature-responsive element. This will complete the circuit through the wire 72 to the contact 64 of the right hand relay and thence through wire 73 to the upper beam of the headlights.

If, however, a short develops in this circuit, the temperature-responsive element 25 will flex downwardly as shown in dotted lines in Fig. 7, and will be moved away from the contact 68 and caused to engage the contact 64 of the left-hand unit, thus completing a circuit through the lower beams of the headlights by way of the conductor 74. Thus with the switch 47 in the position shown, the upper beam of the headlights will be ignited by closing the switch 48, but, upon an overload in this circuit, the lower beams will be lighted and will remain lighted until the temperature-responsive element cools sufficiently to return to its original position, thus again passing the current through the upper beams and causing intermittent lighting of the upper and lower beams.

If the switch 47 is moved to its other position to energize the coil of the magnet 11 at the right of Fig. 8, the lower beams of the headlights will first be employed and, if there is a short in this circuit, then the downward flexing of the temperature-responsive element 25ᵃ of this relay will direct the current to the upper beams in a manner similar to that described before.

While we have shown and described some preferred embodiments of our invention, it will be understood that it is not to be limited to all of the details shown, but is capable of modification and variation within the spirit of the invention and within the scope of the claims.

What we claim is:

1. In combination, a pair of load circuits, one of said circuits comprising a deformable temperature-responsive element and a contact adapted to be engaged thereby, the other circuit also including the said temperature-responsive element and a second contact to be engaged thereby, a relay for effecting engagement between said first contact and said element when the relay is energized and said element is at normal temperatures thereby closing one of said circuits, and said element being adapted to deform when heated and break said engagement and move into engagement with said second contact to close the other of said circuits.

2. In combination with a headlight having a high and a low beam, an electrical circuit operatively connected to one of said beams and including a pair of normally open contacts, a flexibly deformable, current-carrying, temperature-responsive element on which one of said contacts is mounted, said element being deformed by an excess of current passing therethrough, a second circuit operatively connected to the other beam and including a pair of normally open contacts, one of which is also carried by said temperature-responsive element, the other contact of the first circuit being spaced from that of the second circuit and said temperature-responsive element being disposed between said spaced contacts, and means for effecting engagement between said contact on said element and one of said spaced contacts to light one of said beams.

3. In combination with a headlight having a high and a low beam, an electrical circuit operatively connected to one of said beams and including a pair of normally open contacts, a flexibly deformable, current-carrying, temperature-responsive element on which one of said contacts is carried, a second circuit operatively connected to the other beam and including a pair of normally open contacts, one of which is also carried by said temperature-responsive element, the other contact of the first circuit being spaced from that of the second circuit and said temperature-responsive element being disposed between said spaced contacts, and means for effecting engagement between said contact on said element and one of said spaced contacts to light one of said beams, and said temperature-responsive element when heated by an excess of current passing therethrough being flexed to break said engagement and engage the other of said spaced contacts to light the other beam.

4. The combination set forth in claim 1 wherein the relay is provided with a movable armature and the temperature-responsive element is mounted on the armature.

5. The combination set forth in claim 1 wherein the relay is provided with a movable armature, and said first contact is carried by said armature.

JOHN E. ECHLIN.
ERNST A. NORDBERG.
EARL J. SAMBROOK.

REFERENCES CITED

The following references are of record in the file of this patent:

UNITED STATES PATENTS

| Number | Name | Date |
|---|---|---|
| 1,558,331 | Baker | Oct. 20, 1925 |
| 1,743,053 | Travers | Jan. 7, 1930 |
| 1,919,327 | Getchell | July 25, 1933 |
| 1,974,852 | Menzel et al. | Sept. 25, 1934 |
| 2,014,958 | Wilhelm | Sept. 17, 1935 |
| 2,125,990 | Catron et al. | Aug. 9, 1938 |
| 2,131,664 | Johansen | Sept. 27, 1938 |
| 2,311,048 | Harrold | Feb. 16, 1943 |
| 2,338,731 | Morse | Jan. 11, 1944 |
| 2,447,736 | Cheshier | Aug. 24, 1948 |
| 2,496,020 | Pepper | Jan. 31, 1950 |